(12) United States Patent
Duke

(10) Patent No.: US 11,226,540 B2
(45) Date of Patent: Jan. 18, 2022

(54) SHIELD FOR AN EXTERIOR VEHICULAR COMPONENT

(71) Applicant: Danny Ray Duke, West Jordan, UT (US)

(72) Inventor: Danny Ray Duke, West Jordan, UT (US)

( * ) Notice: Subject to any disclaimer, the term of this patent is extended or adjusted under 35 U.S.C. 154(b) by 0 days.

(21) Appl. No.: 16/946,886

(22) Filed: Jul. 10, 2020

(65) Prior Publication Data

US 2021/0011354 A1 Jan. 14, 2021

Related U.S. Application Data

(60) Provisional application No. 62/872,469, filed on Jul. 10, 2019.

(51) Int. Cl.
*G03B 11/04* (2021.01)
*G02B 27/00* (2006.01)
*B60R 11/04* (2006.01)

(52) U.S. Cl.
CPC ........ *G03B 11/045* (2013.01); *G02B 27/0006* (2013.01); *B60R 11/04* (2013.01)

(58) Field of Classification Search
CPC .......................... G03B 11/045; G02B 27/0006
USPC ........................................... 359/507; 348/148
See application file for complete search history.

(56) References Cited

U.S. PATENT DOCUMENTS

| 6,819,231 | B2 | 11/2004 | Berberich et al. |
| 8,821,043 | B2 | 9/2014 | Schutz |
| 9,409,529 | B2 | 8/2016 | Dziurda et al. |
| 9,707,896 | B2 | 7/2017 | Boegel et al. |
| 9,731,662 | B2 | 8/2017 | Barthel et al. |
| 9,751,155 | B2 | 9/2017 | Wang et al. |
| 9,912,912 | B2 | 3/2018 | Buschmann |
| 10,059,280 | B2 | 8/2018 | Cooper |
| 10,160,402 | B2 | 12/2018 | Kim |
| 10,606,151 | B1 | 3/2020 | Esterholt et al. |
| 2003/0098908 | A1 | 5/2003 | Misaiji et al. |
| 2006/0098094 | A1 | 5/2006 | Lott |
| 2006/0103727 | A1 | 5/2006 | Tseng |
| 2008/0112050 | A1* | 5/2008 | Nomura ................. G02B 1/105 359/507 |
| 2013/0016219 | A1 | 1/2013 | Hahner et al. |
| 2013/0265427 | A1 | 10/2013 | Lin et al. |
| 2015/0358509 | A1 | 12/2015 | Austin |
| 2016/0355134 | A1 | 12/2016 | Leary |
| 2017/0274823 | A1 | 9/2017 | Call |
| 2019/0337466 | A1 | 11/2019 | Oba |
| 2019/0377240 | A1 | 12/2019 | Lowe et al. |

\* cited by examiner

*Primary Examiner* — Christopher E Mahoney
(74) *Attorney, Agent, or Firm* — Dunlap Bennett & Ludwig, PLLC

(57) ABSTRACT

A vehicular component shield providing a base plate with an aperture, wherein a shield surface extends from the base plate and circumscribes the aperture. The shield surface has an upper shield surface extending to a downwardly tapered moisture accumulation surface which in turn communicates to a moisture drip point. The distal surfaces of the remaining portion of the shield surface have a plurality of airfoil deflection surfaces defined by a non-zero or non-linear slope or gradient relative to the y-z plane of the base plate, wherein the plurality of airfoil deflection surfaces slope inward toward the aperture relative to the x-y plane of the base plate.

6 Claims, 4 Drawing Sheets

SHIELD FOR AN EXTERIOR VEHICULAR COMPONENT

CROSS-REFERENCE TO RELATED APPLICATION

This application claims the benefit of priority of U.S. provisional application No. 62/872,469, filed 10 Jul. 2019, the contents of which are herein incorporated by reference.

BACKGROUND OF THE INVENTION

The present invention relates to vehicle accessories and, more particularly, a shield for an exterior vehicular component; in certain embodiments, a shield for protecting a vehicle's rear camera lens from weather or debris.

Vehicle rear cameras are often mounted so that the lens is exposed to the weather and road grime, making the rearview camera unusable much of the time unless constantly cleaned.

Existing solutions add a superficial lens that cover the camera lens. These superficial lenses, however, still allow the elements to accumulate on the camera lens, thereby creating the same or similar amount of distortion.

As can be seen, there is a need for a shield for protecting a vehicle's rear camera lens from weather, debris, and road grime without obstructing view and that does not merely layer the shield over the rearview camera lens. The shield embodied in the present invention limits the amount of elements and road debris that come into contact with the camera lens, thereby reducing the need for cleaning of the lens and increases the usefulness and function of vehicle rearview cameras.

SUMMARY OF THE INVENTION

In one aspect of the present invention, a vehicular component shield includes the following: a base plate with an aperture; a shield surface extending from the base plate and circumscribing the aperture; the shield surface having an upper shield surface that transitions, at an interface, to a moisture accumulation surface; and said moisture accumulation surface tapers downwardly to a moisture drip point.

In another aspect of the present invention, the vehicular component shield includes the following: a base plate with an aperture; a shield surface extending from the base plate and circumscribing the aperture; the shield surface having an upper shield surface that transitions, at an interface, to a moisture accumulation surface, wherein the interface is an uppermost portion of the shield surface, wherein the upper shield surface slopes downward from the interface to the base plate; said moisture accumulation surface tapers downwardly to a moisture drip point; and the shield surface having a lower shield surface extending from the base plate to a plurality of airfoil deflection surfaces defined by a non-zero or non-linear gradient relative to a y-z plane of the base plate, wherein the plurality of airfoil deflection surfaces slopes inward toward the aperture relative to a x-y plane of the base plate, wherein the plurality of airfoil deflection surfaces is dimensioned to deflect an airflow thereacross from contacting the aperture.

These and other features, aspects and advantages of the present invention will become better understood with reference to the following drawings, description and claims.

DETAILED DESCRIPTION OF THE INVENTION

Figure 1:
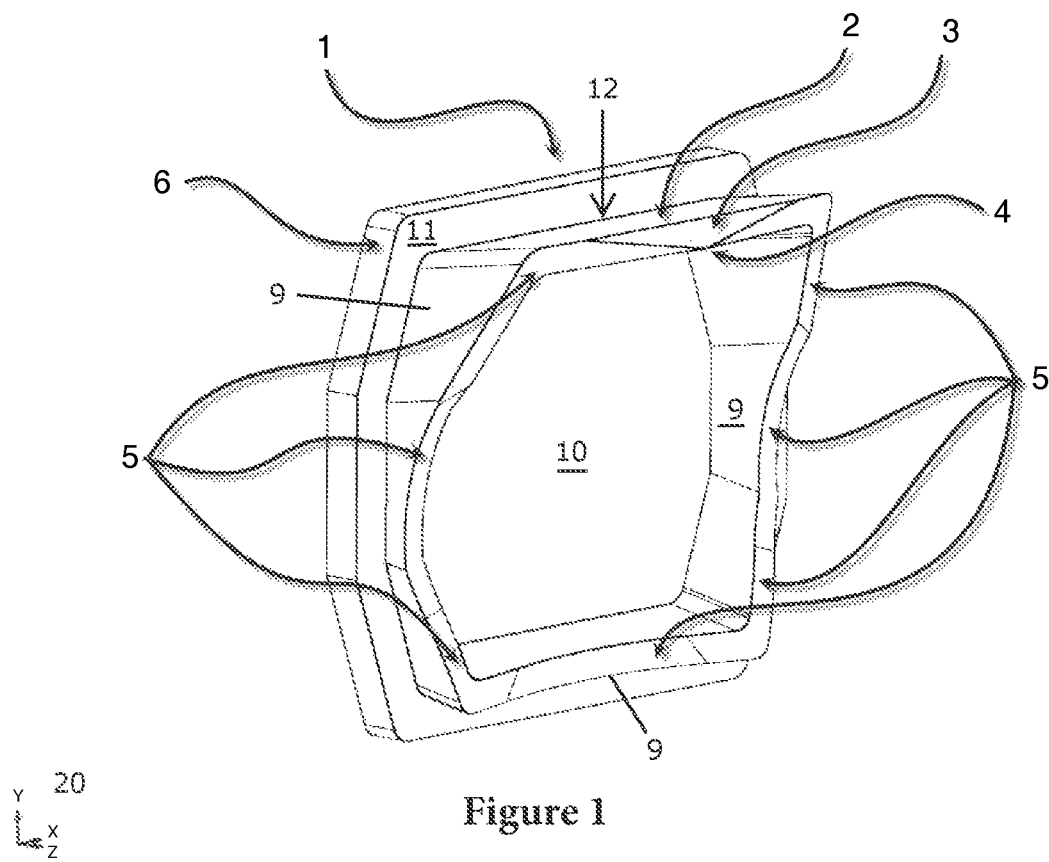
FIG. 1 is a top front perspective view of an exemplary embodiment of the present invention.
Figure 2:
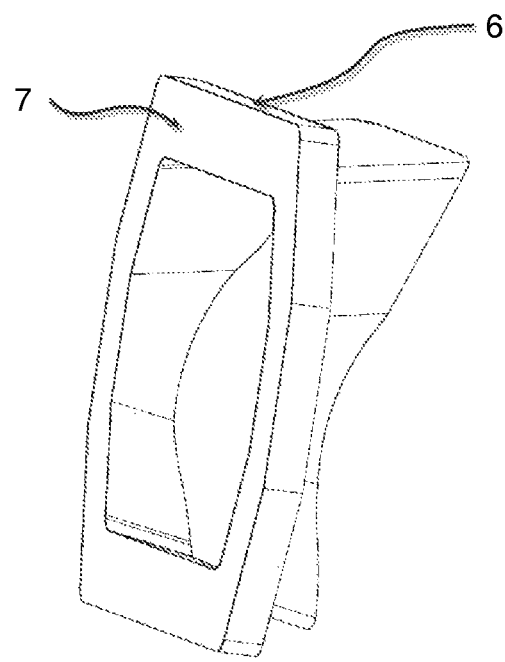
FIG. 2 is a top rear perspective view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a vehicular component shield providing a base plate with an aperture, wherein a shield surface extends from the base plate and circumscribes the aperture. The shield surface has an upper shield surface extending to a downwardly tapered moisture accumulation surface which in turn communicates to a moisture drip point. The distal surfaces of the remaining portion of the shield surface have a plurality of airfoil deflection surfaces defined by a non-zero or non-linear slope or gradient relative to the y-z plane of the base plate, wherein the plurality of airfoil deflection surfaces slope inward toward the aperture relative to the x-y plane of the base plate.

Referring now to FIGS. 1 through 7, the present invention may include a vehicular component shield 1 having a base plate 6 defining an aperture 10. The aperture 10 is dimensioned and adapted to circumscribe a vehicular object 8, like a rearview camera lens 8. A shield surface 12 circumscribes the aperture 10 in whole or in part. The shield surface 12 generally is transversely oriented relative to a shield face 11 of the base plate 6. On the base plate 6, opposite the shield face 11, is a mounting face 7 for attaching to the vehicle.

The shield surface 12 may include an upper shield surface 2 and a lower shield surface 9. The lower shield surface 9, as it circumscribes the aperture 10, extends from the shield surface 11 to a plurality of airfoil deflection surfaces 5. Each airfoil deflection surface 5 may be defined by a non-zero or non-linear slope or gradient relative to an aperture plane defined by the shield surface 11/aperture 10—i.e., the x-y axis of the base plate 6 as defined in reference 20. Each airfoil deflection surface 5 may have a different slope or gradient than an adjacent airfoil deflection surface 5 of the plurality of airfoil deflection surfaces 5. Each airfoil deflection surface 5 may have an inner edge 14 that is closer to the aperture plane relative to an outer edge 15, whereby each airfoil deflection surface 5 tapers inward, toward the aperture 10 (from the outer edge 15 to the inner edge 14, respectively) relative to the y-z plane of the base plate 6 as defined by reference 20.

Figure 3:
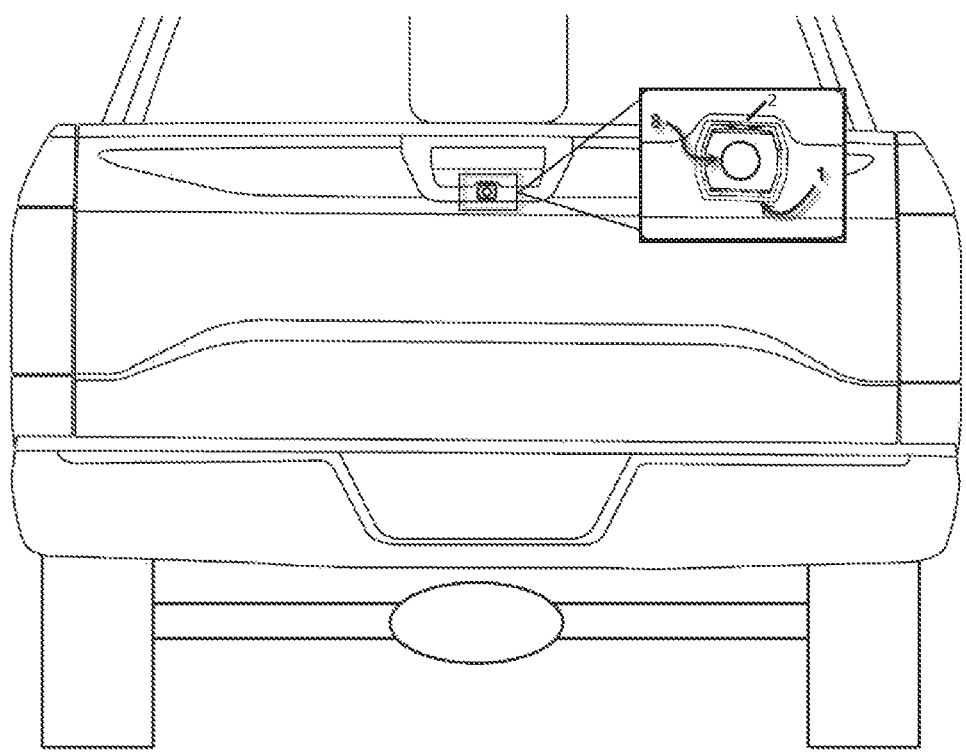
FIG. 3 is an elevation view of an exemplary embodiment of the present invention, shown in use.
Figure 4:
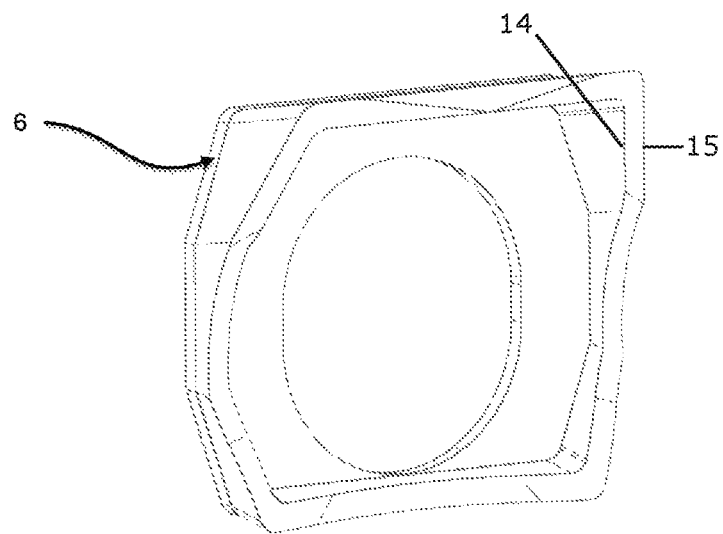
FIG. 4 is a top front perspective view of an exemplary embodiment of the present invention.
Figure 5:
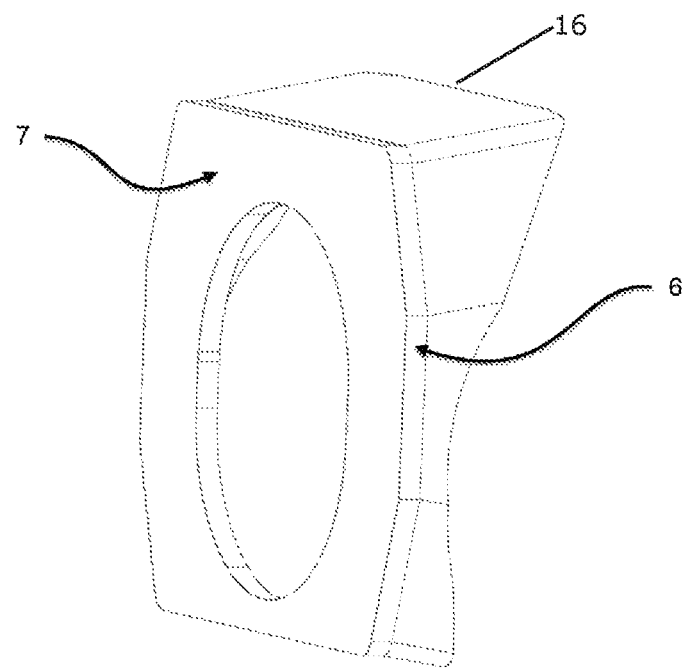
FIG. 5 is a top rear perspective view of an exemplary embodiment of the present invention.
Figure 6:
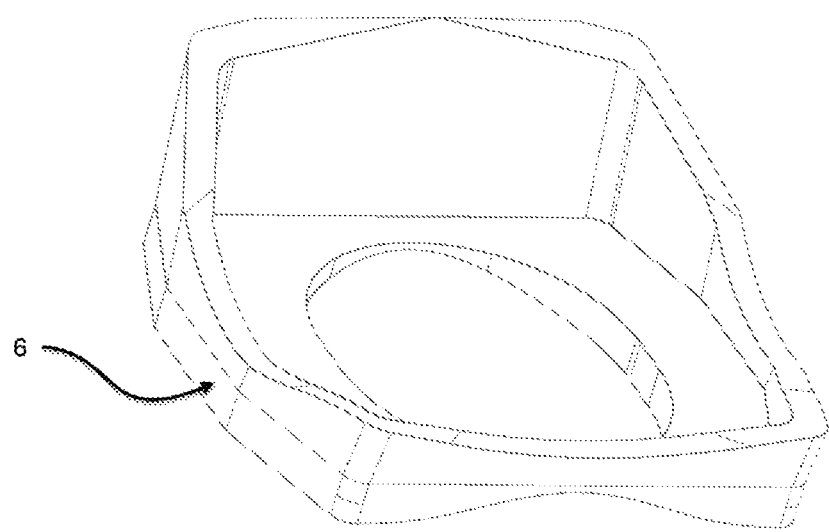
FIG. 6 is a bottom front perspective view of an exemplary embodiment of the present invention.
Figure 7:
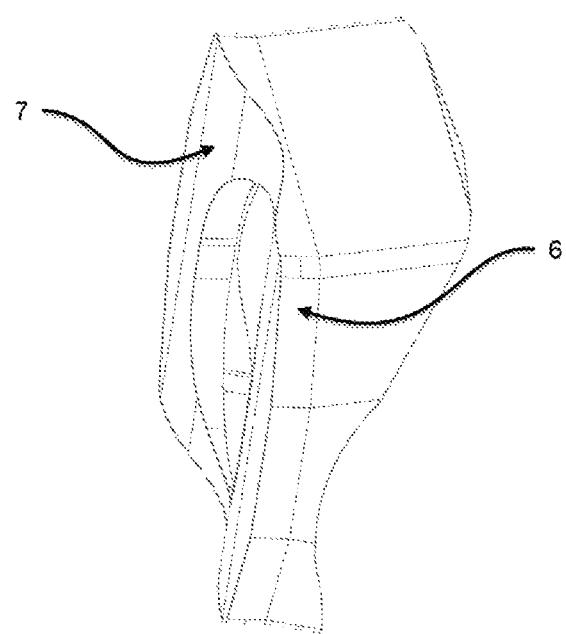
FIG. 7 is a bottom rear perspective view of an exemplary embodiment of the present invention.

The upper shield surface 2 is disposed "above" the aperture during use, as illustrated in FIG. 3. The lower shield surface 9 extends from the shield surface 11 to an interface 16 of a moisture accumulation surface 3 that communicates with a moisture drip point 4. The moisture drip point 14 is downward (when in use) of the moisture accumulation surface 3. When the present invention is in use, relative to said interface 16, the moisture accumulation surface 3 tapers downwardly to the moisture drip point 14; in certain embodiments, defining a triangular shaped moisture accumulation surface 3. From the interface 16 to the shield surface 11, the upper shield surface 2 slopes downwardly; thus, in certain embodiments, the interface 16 is the highest point (when in use) of the shield surface 12.

The mounting surface 7 may be planar or have contours to conform with a portion of the vehicular surface that the present invention is engaging or otherwise mounting to.

The base plate 6 may extend beyond the shield surface 12; in certain embodiment, extending 0.01" to 0.360" from the shield surface 12, or in other words approximately 0.180". The base plate 6 may have an overall height of approximately 1.3", for instance between 1.1 and 1.5". In some embodiments, the base plate 6 has no more than 0.165" from the most outer left or right surface to the nearest most opposite inner surface with an overall width of 1.5". And the base plate 6 having no more than 0.55" from the bottom mounting surface 7 to the tip of moisture drip point 4. In other embodiments, the base plate 6 has no more than 0.18" from the bottom mounting surface 7 to the closest surface point of airfoil deflection surface 5 on the left, right or bottom edge when viewed from the most forward-facing view of vehicular component shield 1 as mounted on the rear of the vehicle.

Though it should be understood that the base plate 6 and mounting surface 7 can have various sizes, shapes, and profiles, in order to accommodate mounting on various vehicles, makes, and models, as long as the present invention functions as disclosed herein.

A method of using the present invention may include the following. The vehicular component shield 1 disclosed above may be mounted by way of the mounting surface 7 to the vehicle over the vehicle vehicular component (rearview camera lens) 8. In certain embodiments, the mounting surface 7 may be attached to the vehicle by way of adhesive, magnetism, or other joining methods that join one object to another object. When so mounted, the upper shield surface 2 shields the vehicular component (rearview camera lens) 8 from descending/falling moisture or debris. As descending/falling moisture in the form of rain or snow lands on the upper shield surface 2, some or all of the resulting moisture flows onto the downward sloped moisture accumulating surface 3. The moisture accumulates until the force of gravity or motion-related forces urges the moisture to and off the drip point 4, thereby preventing moisture from collecting on the vehicular component (rearview camera lens) 8.

Furthermore, as air moves across the vehicular component shield 1 and crosses the airfoil deflection surfaces 5, the air is moved in such a manner to deflect the air from contacting the vehicular component (rearview camera lens) 8. This is true regardless of the airflow direction across airfoil deflection surfaces 5 on the vehicular component shield 1.

Additionally, the present invention may be adapted to be installed on different types of vehicles where the intrinsic attributes of the invention will benefit such an application.

It should be understood, of course, that the foregoing relates to exemplary embodiments of the invention and that modifications may be made without departing from the spirit and scope of the invention as set forth in the following claims.

What is claimed is:

1. A vehicular component shield, comprising:
   a base plate with an aperture;
   a shield surface extending from the base plate and circumscribing the aperture;
   the shield surface having an upper shield surface that transitions, at an interface, to a moisture accumulation surface;
   the shield surface having a lower shield surface extending from the base plate to a plurality of airfoil deflection surfaces defined by a non-zero or non-linear gradient relative to a y-z plane of the base plate; and
   said moisture accumulation surface tapers downwardly to a moisture drip point.

2. The vehicular component shield of claim 1, wherein the plurality of airfoil deflection surfaces slopes inward toward the aperture relative to a x-y plane of the base plate.

3. The vehicular component shield of claim 1, wherein the plurality of airfoil deflection surfaces is dimensioned to deflect an airflow thereacross from contacting the aperture.

4. The vehicular component shield of claim 1, wherein the interface is an uppermost portion of the shield surface.

5. The vehicular component shield of claim 1, wherein the upper shield surface slopes downward from the interface to the base plate.

6. A vehicular component shield, comprising:
   a base plate with an aperture;
   a shield surface extending from the base plate and circumscribing the aperture;
   the shield surface having an upper shield surface that transitions, at an interface, to a moisture accumulation surface, wherein the interface is an uppermost portion of the shield surface, wherein the upper shield surface slopes downward from the interface to the base plate;
   said moisture accumulation surface tapers downwardly to a moisture drip point; and
   the shield surface having a lower shield surface extending from the base plate to a plurality of airfoil deflection surfaces defined by a non-zero or non-linear gradient relative to a y-z plane of the base plate, wherein the plurality of airfoil deflection surfaces slopes inward toward the aperture relative to a x-y plane of the base plate, wherein the plurality of airfoil deflection surfaces is dimensioned to deflect an airflow thereacross from contacting the aperture.

* * * * *